United States Patent
Ramachandran et al.

(10) Patent No.: US 7,395,864 B2
(45) Date of Patent: Jul. 8, 2008

(54) METHOD AND APPARATUS FOR PREVENTING SLUG FLOW IN PIPELINES

(75) Inventors: Sunder Ramachandran, Sugar Land, TX (US); Christopher T. Gallagher, Katy, TX (US); Michael D. Loudermilk, Humble, TX (US); Jiang Yang, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/295,019

(22) Filed: Dec. 6, 2005

(65) Prior Publication Data

US 2006/0169457 A1 Aug. 3, 2006

Related U.S. Application Data

(60) Provisional application No. 60/633,715, filed on Dec. 6, 2004.

(51) Int. Cl.
*E21B 43/01* (2006.01)
*F17D 1/17* (2006.01)
*B65G 53/58* (2006.01)

(52) U.S. Cl. .................. 166/310; 166/368; 137/13; 406/46

(58) Field of Classification Search ............ 166/310, 166/368, 270, 270.1, 270.2; 137/13; 406/46, 406/47, 48, 49, 94; 507/90, 200
See application file for complete search history.

(56) References Cited

U.S. PATENT DOCUMENTS

| 3,491,832 | A | * | 1/1970 | Raza ........................ 166/269 |
| 3,601,079 | A | * | 8/1971 | Giles et al. ................ 114/67 R |
| 4,451,183 | A | * | 5/1984 | Lorenz ...................... 406/94 |
| 4,688,589 | A | | 8/1987 | Brainerd et al. |
| 4,881,566 | A | | 11/1989 | Ubels et al. |
| 5,027,843 | A | | 7/1991 | Grabois et al. |
| 5,113,277 | A | | 5/1992 | Ozawa et al. ............... 359/127 |
| 5,361,797 | A | | 11/1994 | Crow et al. |
| 6,271,766 | B1 | | 8/2001 | Didden et al. ............ 340/853.1 |

* cited by examiner

*Primary Examiner*—Kenneth Thompson
(74) *Attorney, Agent, or Firm*—Madan, Mossman & Sriram, P.C.

(57) ABSTRACT

Disclosed is a method and system for controlling the formation of liquid or gas slugs along a pipeline. In embodiments, an injection unit injects a liquid surface tension reducing agent, such as a foamant, into the pipeline upstream of the high point. A control unit can be used to control the injection unit. In certain arrangements, the control unit adjusts the injection of the agent based on measured parameters of interest. In embodiments where the control unit utilizes temperature measurements, one or more temperature sensors are positioned along the pipeline. The control unit utilizes the temperature measurements to determine whether a predetermined condition exists or a liquid or gas slug is present.

24 Claims, 3 Drawing Sheets

METHOD AND APPARATUS FOR PREVENTING SLUG FLOW IN PIPELINES

This application takes priority from U.S. Provisional Application Ser. No. 60/633,715 filed on Dec. 6, 2004.

BACKGROUND OF THE INVENTION

1. Field of the Invention

This invention relates to the controlling gas or liquid slugs in of pipelines and more particularly to controlling gas or liquid slugs in undersea pipelines.

2. Background of the Art

Pipelines are widely used in a variety of industries, allowing a large amount of material to be transported from one place to another. A variety of fluids, such as oil and/or gas, as well as particulate, and other small solids suspended in fluids, are transported cheaply and efficiently using underground pipelines. Pipelines can be subterranean, submarine, on the surface of the earth, and even suspended above the earth. Submarine pipelines especially carry enormous quantities of oil and gas products indispensable to energy-related industries, often under tremendous pressure and at low temperatures and at high flow rates.

Undersea or submarine pipelines typically carry formation fluids from one or more subsea wells. These formation fluids may be, but are not limited to, a gas, a liquid, an emulsion, a slurry and/or a stream of solid particles that has flow characteristics similar to liquid flow. The influent can be a single phase, a two phase or even a three phase admixture. Thus, production fluid can have up to three phases of non-solid materials: hydrocarbons, aqueous solutions, and gas. The production fluid can include solids, some actually exiting the well as solids and other solids precipitating due to changes in temperature, pressure or production fluid composition.

Undersea pipelines, particularly those pipelines running from undersea production wells to loading facilities, commonly referred to as flowlines, can be susceptible to slug formation. Flowlines can stretch for thousands of feet along the subsea floor. In many instances, the flowline can be several thousand feet below the water line, which then requires a vertical leg or riser of similar height to connect the subsea flow line to a surface collection facility. This riser can create a substantial pressure head in the subsea flow line.

During production of a hydrocarbon gas, such as natural gas, condensate entrained in the gas can accumulate at the low points or valleys along the flowline that is situated along an uneven terrain of the subsea floor and/or at the lowermost or base of the riser. The condensate can be a liquid hydrocarbon or water. In any case, the condensate can grow in size to form a liquid slug.

In many instances, the liquid slug can increase in size to an extent that partially or fully occludes the flow bore of the flow line or riser, either of which disrupts the flow of gas to the production facility. Slugs in the flow line can create discontinuities in the pressure gradient across the flow line, which can markedly reduce production flow rates. Moreover, liquid slugs entering in the riser accelerate towards the upper end of the riser due to the increased gas pressure in the partially or fully blocked flow line or riser. Moreover, as should be appreciated, a high-pressure gas or gas slug trails this high-velocity liquid slug. The sudden onrush of these liquid and gas slugs, which can alternate, can pose a severe threat to surface equipment and personnel.

In other instances, the peaks or high points along such a flowline can enable the gas component of the production fluid to collect. In some instances, the gas forms a bubble or bubbles that can grow in size at the high point. As can be appreciated, the gas bubble can to some degree restrict the flow cross-sectional area at the high point, which can lead to an undesirable decrease in flow rates and/or an increase in back pressure. Another problem arises when the gas bubble is released from the high point and flows along the pipeline. The relatively substantial pressure head in the subsea flow line and rise can highly compress this gas slug. As the gas slug moves up the riser toward the surface, the pressure head gradually decreases, which causes the gas to decompress and increase in size. In some cases, gas slugs that are centimeters in diameter in the flow line can expand into diameters of several meters as they approach the surface, which can stress or overwhelm surface equipment.

Conventionally, surge tanks, slug catchers and other devices at the surface facility are used to manage the effects of liquid or gas slugs in the production fluid. Such devices can take up space on the deck of the surface facility. Typically, however, the deck space on an offshore rig or similar facility can be exceedingly limited. Moreover, gas slugs can cause corrosion in the pipe lines as well as make corrosion inhibition difficult. Consequently, it would be desirable in the art of operating pipelines to be able to reduce or eliminate liquid and/or gas slugs without resorting to complex surface equipment that take up surface deck space.

The present invention addresses these and other drawbacks of the prior art.

SUMMARY OF THE INVENTION

This invention provides a system and method for minimizing the risk of slug formation in a flowline for land based or subsea oil well operations. In one embodiment, a liquid surface tension reducer, such as a foamant, is injected into the flowline or well to prevent or reduce the build up of liquid or gas slugs along a flow line. The foamant interacts with a two-phase production fluid, which may or may not include particulates, to substantially reduce the size of the liquid or gas slug and thereby minimize the formation of slugs along the flowline or in the riser. An exemplary system can include tanks for storing one or more foamants and one or more pumping systems for injecting or pumping the foamant(s) into a subsea wellhead, a subsea wellbore, or a flowline from one or more wellbores.

In embodiments, the system monitors one or more selected locations along a flow line to determine whether a gas or liquid slug exists and/or whether conditions are conducive to the formation of a gas or liquid slug. Based on this determination, the system injects an appropriate foamant into the production fluid. In one arrangement, the system includes sensors distributed along a flow line from a subsea wellhead. One or more control units are programmed to control the operation of the injection system in response to the measurements. For example, the controller can inject an oil soluble foamant into the production fluid when measurements indicate the formation of a hydrocarbon liquid slug or bubble at some point, e.g., a low point, along a flowline. The sensors can measure parameters of interest such as pressure, temperature, flow rates, and stress/strain in the walls of the pipe. In one aspect, the control unit uses programs or algorithms with dynamically updatable models to control the foamant injection process. This provides a closed-loop system wherein static or dynamic models may be utilized to monitor and control the foamant injection process.

Examples of the more important features of the invention have been summarized rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For a detailed understanding of the present invention, reference should be made to the following detailed description of the one mode embodiments, taken in conjunction with the accompanying drawings, in which like elements have been given like numerals, wherein.

DETAILED DESCRIPTION OF THE INVENTION

The present invention includes devices, systems and methods for inducing an annular flow regime along a pipeline or flowline by minimizing slug formation. In one exemplary application, the pipeline is a flowline that is an element of a subsea oil and gas production, collection, and shipping facility, including an offloading system, such as a buoy or platform offloading system. Product leads normally extend from subsea wells to a manifold from which flow lines bring the production fluid to a buoy or platform for transport. Such product flowlines have been metal pipes, sometimes with intermediate floatation devices located along the lengths of the product flowlines, to provide a suitable contour or configuration to the flowlines to avoid excessive loads resulting from the weight of the flowlines. In another exemplary application, the pipeline is land-based and receives production flow from a surface wellhead or other source.

Figure 1:
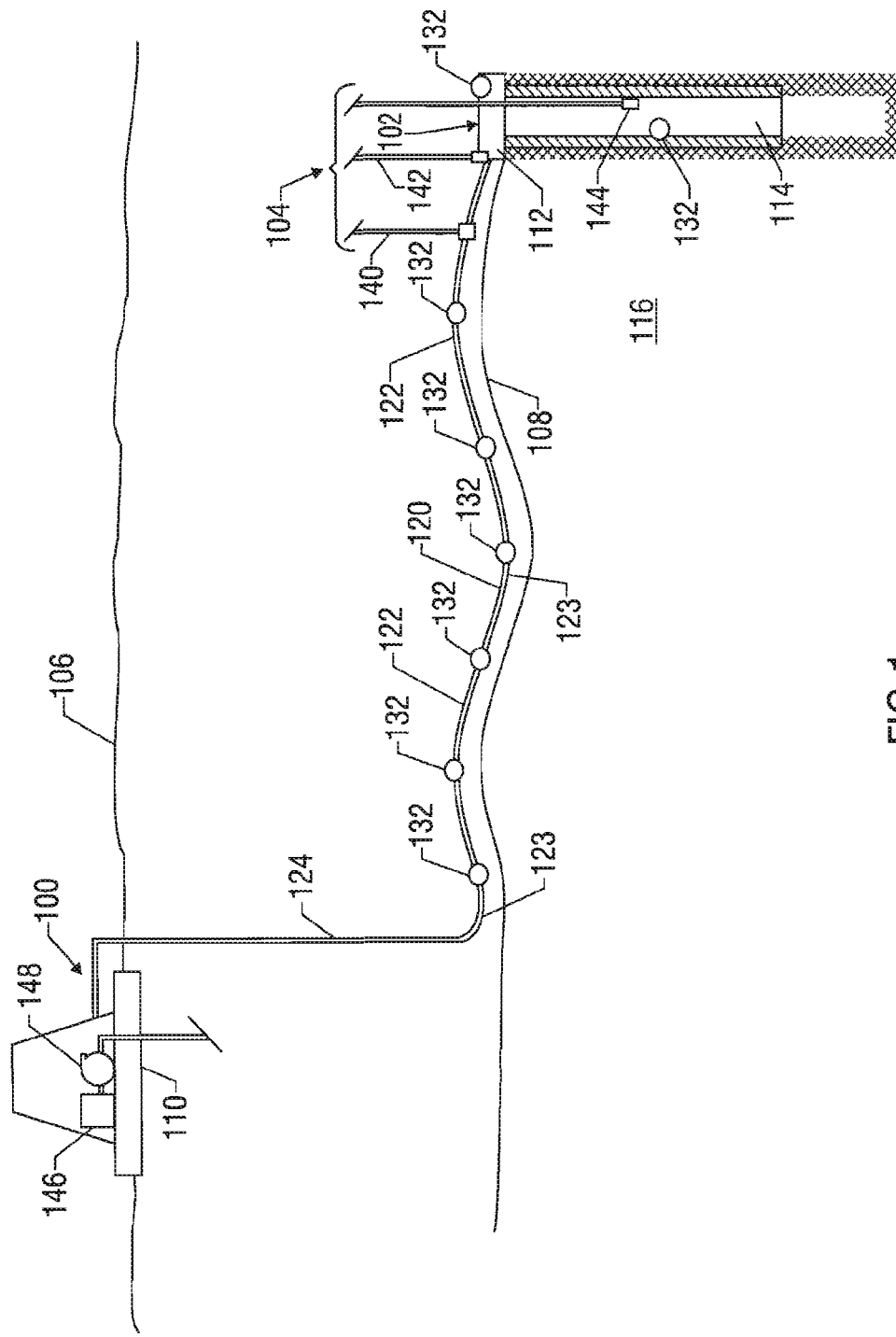
FIG. 1 is a schematic illustration of an offshore production facility having an foamant injection and monitoring system made according to one embodiment of the present invention.

The devices, systems and methods of the present invention can be used with any pipeline, whether on land or subsea. Exemplary applications include subsea pipelines where the great depth of the pipeline can make the pipeline relatively inaccessible and where the pipelines include a header or vertical section that forms a substantial pressure head. FIG. 1 shows such a pipeline.

Referring initially to FIG. 1, there is schematically shown an exemplary offshore hydrocarbon recovery facility 100 for recovering hydrocarbons such as oil and gas from one or more subsea wells 102. In one embodiment of the present invention, a slug control system 104 deployed in conjunction with the facility 100 located at a water's surface 106. The system 104 services one or more subsea production wells 102 residing in a seabed 108. Conventionally, each well 102 includes a wellhead 112 and related equipment positioned over a wellbore 114 formed in a subterranean formation 116. Production fluid is conveyed to a surface collection facility such as the surface facility 100 or separate structure, such as a subsea collection and/or processing facility (not shown), via a line 120. The fluid may be conveyed to the surface facility 100 in an untreated state or after being processed, at least partially, by the production fluid-processing unit (not shown). The line 120 extends directly from the wellhead 112 or from a manifold (not shown) that receives production flow from a plurality of wellheads 112.

The flow line 120 includes one or more high points 122, one or more low points 123, and a vertical section or riser 124 that terminates at the facility 100. As discussed previously, slugs can form at the high points 122, at low points 123 along a flow line 120, and at or adjacent the riser 124. The slug control system reduces and/or eliminates liquid or gas slugs by selectively injecting a surface tension reducing agent into the flow line 120 or the well 102. The agent effectively converts a two-phase production fluid flow, e.g., liquid and gas, into a single phase flow, e.g., a gas flow with entrained liquids or a liquid flow entrained with relatively small gas bubbles, that is generally not susceptible to slug formation, which then can promote annular flow. This annular flow and reduced instances of slug formation can provide a stable pressure gradient across the flow line 120, which then can improve production flow rates. Suitable liquid surface tension reducing agents include, but are not limited to, oil soluble foamants and water soluble foamants.

In one embodiment, the slug control system 104 can be utilized with one or more sensors 132 positioned along selected locations along the flow line 120 and the well 102. During production operations, the slug control system 104 supplies (or pumps) one or more foamants to the flow line 120. This supply of foamants may be continuous, intermittent or actively controlled in response to sensor measurements. In one mode of controlled operation, the slug control system 104 receives signals from the sensors 132 regarding a parameter of interest relating to a characteristic of the produced fluid. Representative parameters of interest can relate to temperature, pressure, flow rate, amount of water, and other parameters indicative of liquid or gas slugs. Based on the data provided by the sensors 132, the slug control system 104 determines the appropriate type and/or amount of foamant or foamants needed to reduce the likelihood of slug formation at the high points 122 or the low points 123.

In embodiments, the slug control system 104 can include one or more supply lines 140, 142, 144 that dispense foamant into the pipeline 120 a location upstream of the high point 122, the low point 123, into the wellhead 102, in a manifold (not shown) or into a location downhole in the wellbore 114, respectively. A foamant supply tank or tanks 146 and injection units 148 can be positioned on the surface facility 110. In other embodiments, one or more of the supply lines 140, 142, 144 can be inside or along the flowline 120. While multiple dispensation points are shown, it should be understood that a single dispensation point may be adequate. Moreover, the above-discussed locations are merely representative of the locations at which the foamant can be dispensed into the production fluid.

Figure 2:
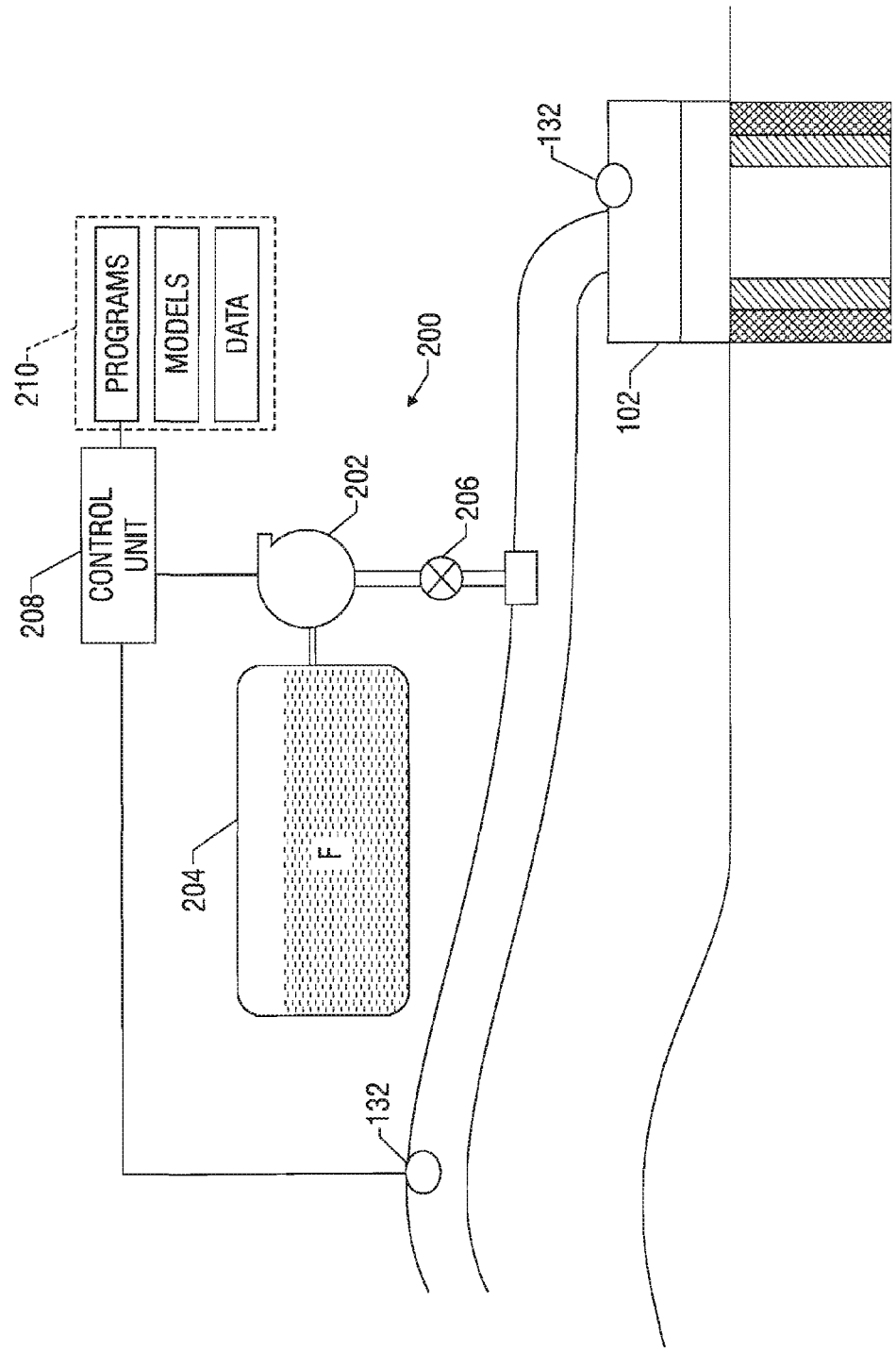
FIG. 2 is a schematic illustration of a foamant injection and monitoring system according to one embodiment of the present invention.

Referring now to FIG. 2, there shown a schematic diagram of a slug control system 200 according to another embodiment of the present invention. The system 200 is adapted to inject one or more foamants into the flow line 120 and/or the wellbore 102. In one embodiment, the system 200 includes a foamant injection unit 202, a tank 204 that supplies one or more foamants, a valve assembly 206, and a control unit 208. The control unit 208 can be programmed to monitor flowline conditions and alter the injection process according to one or more pre-programmed instructions. The well 102 is shown as a production well using typical completion equipment. The well 102 usually includes a casing 103 in the wellbore 114. A flow line 120 leads to a surface location or a manifold (not shown). Not shown are known equipment such as a blowout preventor stack, valves for controlling fluid flow and other known wellhead equipment and production well equipment.

Referring still to FIG. 2, in one aspect of the present invention, a selected foamant F is injected into the flow line 120 by the injection unit 202 (e.g., a positive displacement pump). The foamant F can be an oil soluble foamant, a water soluble foamant and/or other suitable agent for reducing surface tension of a liquid. The tank 204 can be periodically filled via a supply line (not shown). Alternatively, the foamants F may be supplied directly from a surface chemical supply (not shown). Alternatively, a remotely operated vehicle or other conventional methods may be used to replace tank 204. Of course, certain embodiments can include a combination of supply arrangements. Likewise, any suitable pump and monitoring system may be used to inject foamants into the flow line 120.

In one embodiment of the present invention, the control unit 208 controls the operation of the injection unit 202 and/or the valve assembly 206 and includes a microprocessor 210 and resident memory that may include read only memories (ROM) for storing programs, tables and models, and random access memories (RAM) for storing data. The models may be dynamic models in that they are updated based on the sensor inputs. A power-unit (not shown) can include an AC power unit, an onsite generator, and/or an electrical battery that is periodically charged from energy supplied from a surface location. Alternatively, power may be supplied from the surface (not shown).

Embodiments of the control unit 208 can be programmed to periodically monitor the actual amounts of the foamant being dispensed via the valve assembly 206, determine the effectiveness of the dispensed foamant, determine the amount or type of the foamant that would improve the effectiveness of the system and then appropriately adjust the injection unit 202 and/or valve assembly 206 to dispense the selected type of foamant according to newly computed amounts. For example, the type of foamant dispensed can be selected based on the phase of the fluid, chemical make-up of the formation fluid, the ratio of hydrocarbons to water, ph level, acidity and other factors that influence the effectiveness of a particular foamant. Since the system 200 can be closed loop in nature and can respond to the in-situ measurements of the characteristics of the treated fluid and the equipment in the fluid flow path, it can administer the optimum amounts of the various foamants to the wellbore or pipeline to maintain the various parameters of interest within their respective limits or ranges. In other embodiments, the injection unit 202 and valve assembly 206 can be configured to dispense foamants F without the control unit 208. For example, the injection unit 202 and valve assembly 206 can be configured to provide a continuous flow of foamant or utilize a device such as a timer to periodically dispense foamant.

Figure 3:
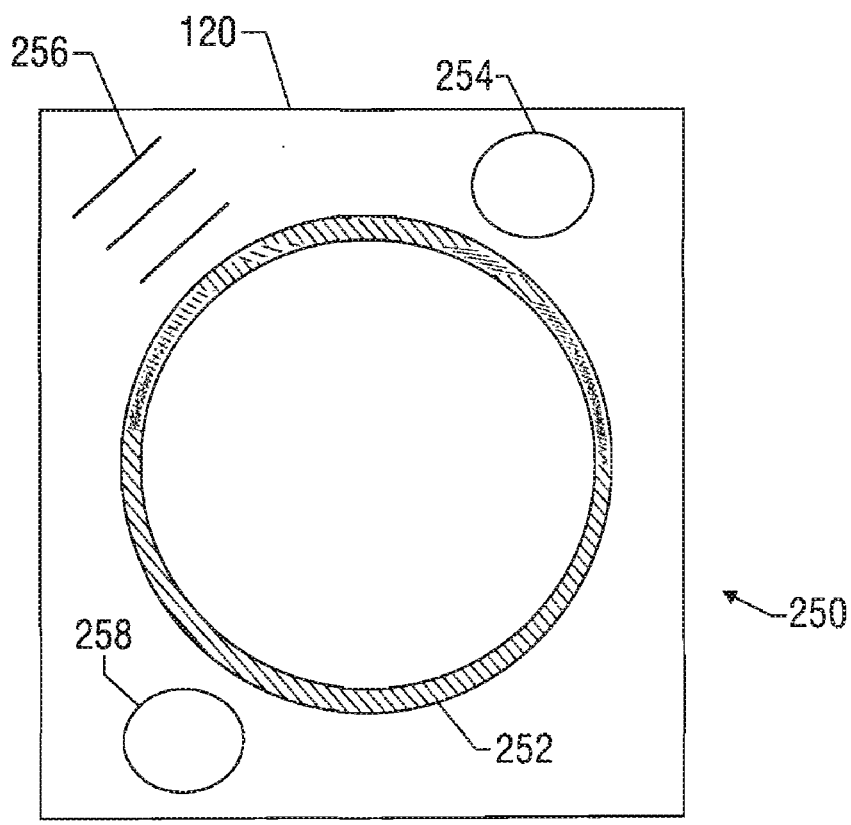
FIG. 3 shows a cross-sectional view of a flowline at a high point that uses one embodiment of the present invention.

Referring now to FIGS. 1-3, in one embodiment, the system 200 is configured to inject foamants in response to temperature measurements from the sensors 254. Production fluids, when produced out of the wellbore, are often very warm. However, as they are transported along a pipeline that is at a very low depth, the fluids can become very cold. In embodiments of the present invention, the rate of transfer of heat between the interior and exterior of the pipeline is used to determine where one or more high points 122 has accumulated a gas slug or where one or more low points 123 has accumulated a liquid slug. In FIG. 3, a cross section of the pipeline 120 is shown. The pipeline 120 includes a bundle 250, which in turn includes the pipe 252, a temperature sensor 254, and optional insulation 256. In addition, the bundle can also include a heater 258. In one embodiment, a temperature sensor array is used along the entire length of the pipeline 120. While any means of making temperature measurements can be used as the sensors 254 for the present invention, the sensors that are part of a fiber optic distributed sensor array may be advantageous in certain applications. Such fiber optic distributed sensor arrays are known in the prior art and are disclosed in, for example, U.S. Pat. Nos. 6,271,766 and 5,113,277. In embodiments, the sensor array consists of a fiber optic cable and temperatures sensors distributed along the cable that is positioned on or inside the pipe 120 or embedded in the wall of the pipe 120. Suitable separation distances can range from 1 meter to 100 meters, with sensors positioned at or proximate to the high points 122. Other suitable temperatures sensors can include devices such as resistance temperature detectors and thermocouples that are imbedded in or positioned on or inside the pipeline 120.

In other arrangements, the sensors 132 can include devices that measure other parameters affected by gas slugs or liquid slugs. For example, pressure sensors may be used to detect pressure variations caused by the liquid or gas slugs. Also, the flow meters can be used to measure the flow rate of production fluids flowing through the pipe 120. Moreover, strain gages embedded in the pipe 120 can be used to measure or detect deformation of the pipe 120 that is caused by a gas slug such as diametrical or axial expansion or contraction. Of course, a plurality or mixture of different types of sensors can be used in some applications.

A number of arrangements can be used to conjunction with the parameter measurements. For example, the control unit can compare parameter measurements to one or more preset norms (e.g., a value, range, rate of change, etc.) and adjust the amount of foamant being dispensed. These parameter measurements can be taken at the high points 122, at a low point 123, at the well 102, or other location. In another example, the measurements can be taken at selected locations along the pipe 120 and compared to one another. For example, temperature sensors can be positioned at the top and bottom of a high point 122. Because, the thermal conductivity of gases and liquids are different, the presence of gas at the top of a high point 122 can lead to a different temperature reading than a temperature reading at the bottom of a high point 122 where liquid is present. In still other arrangements, multiple temperature, pressure, and/or flow rate measurements made linearly along the pipe can be compared to one another.

Moreover, the parameter data can be used to develop models, which can be dynamically updated, that can be used to predict the accumulation of liquid or gas slugs. For example, a temperature, pressure, and/or flow rate history of the pipeline can be used to generate a model for detecting liquid or gas slugs in the pipeline 120. For example, this model can include empirical data correlating a given gradient or profile to the presence of a liquid or gas slug. Thus, real-time parameter measurements trending toward such a given gradient or profile can be used as an triggering event to start the dispensing of foamants.

In embodiments, multiple sensor arrays can be run along different circumferential locations on the pipeline, e.g., along the top, bottom, sides, etc. Also, while it may facilitate construction to affix a sensor array on interior or the exterior surface of the pipe, in certain arrangements, the array can be inset into the wall of the pipe. Further, the sensor array can be placed in contact with an insulative material on the surface of the pipe if there is a substantial temperature differential between the interior and exterior of the pipe.

While the illustrative embodiment shows one wellhead and slug control system, it will be understood that it is common to drill several wellbores from the same location. For example, it is common to drill 10-20 wellbores from a single offshore platform. Several embodiments may be used in such situations. In one embodiment, after the wells are completed and producing, a separate subsea or surface pump and meter inject foamants into each such wellbore. The individual controllers communicate with the sensors, pump controllers and remote control unit via suitable corresponding connections. In other embodiments, a surface or subsea central system is used to inject foamant into the several flow lines.

Additionally, it should be understood that the term "slug" should be construed as a liquid body that has accumulated in size to a point where it could create an out of norm condition in a pipe line or associated equipment. Further, the terms pipe line and flow line refer generally to any conduit adapted to convey fluid.

Those of skill in the art will recognize that numerous modifications and changes may be made to the exemplary designs and embodiments described herein and that the invention is limited only by the claims that follow and any equivalents thereof.

What is claimed is:

1. A system for controlling the formation of a slug along a pipeline receiving at least a two-phase production fluid from a well, comprising:
   (a) a supply line in fluid communication with the production fluid dispensing at least an oil surface tension reducing agent into the production fluid in an amount functionally effective to reduce formation of the slug along the pipeline, wherein the agent includes at least an oil soluble foamant.

2. The system according to claim 1 wherein the supply line dispenses the agent into one of (i) in the pipeline, (ii) a manifold, (iii) at a wellhead, and (iv) in a wellbore.

3. The system according to claim 1 wherein the supply line further dispenses a water surface tension reducing agent into the production fluid in an amount functionally effective to reduce formation of a water slug along the pipeline.

4. The system according to claim 1 wherein the pipeline is located at one of (i) a subsea location, and (ii) a land location.

5. The system according to claim 1 further comprising an injection unit pumping the agent into the production fluid.

6. A system for controlling the formation of a slug along a pipeline receiving at least a two-phase production fluid from a well, comprising:
   a supply line in fluid communication with the production fluid dispensing at least an oil surface tension reducing agent into the production fluid in an amount functionally effective to reduce formation of the slug along the pipeline;
   an injection unit pumping the agent into the production fluid; and
   a control unit controlling the injection unit in response to a measured parameter of interest.

7. The system according to claim 6 wherein the measured parameter of interest selected from a group consisting of (i) pressure, (ii) temperature, (iii) flow rate, and (iv) stress in a wall of the pipeline.

8. The system according to claim 6 further comprising at least one sensor positioned at one of (i) at a high point, (ii) at a location along the pipeline, and (iii) at the well, (iv) a low point, the control unit receiving measurements from the at least one sensor.

9. The system according to claim 6 wherein the measurements are made using an optical fiber distributed sensor array.

10. The system according to claim 6 wherein the control unit includes processor having a model, the control unit utilizing the model with the measured parameter to control the injection unit.

11. A system for recovering hydrocarbons from a subsea wellbore, comprising:
    (a) a wellhead positioned over the sub sea wellbore;
    (b) a flow line connected to the wellhead at one end and connected to a hydrocarbon receiving facility at the other end, a two-phase producing fluid flowing through the flow line after being produced from the wellhead;
    (c) a supply line in fluid communication with the production fluid; and
    (d) an injection unit connected to the supply line injecting an oil surface tension reducing agent into the production fluid in an amount functionally effective to reduce formation of one or more slugs along the flow line.

12. The system according to claim 11 wherein the agent is injected into the formation fluid at one of (i) in the flow line, (ii) at the wellhead, (iii) in the wellbore; (iv) a manifold; and (v) a riser connected to the flow line.

13. The system according to claim 11 wherein the agent is an oil soluble foamant.

14. The system according to claim 13 wherein the control unit controls the injection unit in response to a measured parameter of interest.

15. The system according to claim 14 wherein the measured parameter of interest selected from a group consisting of (i) pressure, (ii) temperature, (iii) flow rate, and (iv) stress in a wall of the flow line.

16. The system according to claim 15 further comprising at least one sensor positioned at one of (i) at the high point, (ii) at a location along the flow line, and (iii) at the well, the control unit receiving temperature measurements from the at least one sensor.

17. The system according to claim 15 wherein the injection unit further injects a water surface tension reducing agent into the production fluid in an amount functionally effective to reduce formation of a water slug along the flow line.

18. A method for controlling the formation of a slug along a pipeline receiving at least a two-phase production fluid from a well, comprising:
    (a) dispensing an oil surface tension reducing agent into the production fluid at a selected location along the pipeline in an amount functionally effective to reduce formation of the slug along the pipeline, wherein the agent is an oil soluble foamant.

19. The method according to claim 18 wherein the selected location is one of (i) a point upstream of a high point on the pipeline, (ii) in the pipeline, (iii) at a wellhead, (iv) in a wellbore, and (v) a riser.

20. The method according to claim 18 further comprising:
    (a) determining a parameter of interest relating to the production fluid;
    (b) selecting an agent from a plurality of oil surface tension reducing agents based on the determined parameter of interest; and
    (c) dispensing the selected agent into the production fluid.

21. The method according to claim 18 further comprising controlling the dispensing of the agent using a control unit.

22. The method according to claim 21 wherein the control unit controls the dispensing of agent in response to a measured parameter of interest.

23. The method according to claim 22 wherein the measured parameter of interest selected from a group consisting of (i) pressure, (ii) temperature, (iii) flow rate, and (iv) stress in a wall of the pipeline.

24. The method according to claim 18 further comprising dispensing a water surface tension reducing agent into the production fluid in an amount functionally effective to reduce formation of a water slug along the pipeline.

* * * * *